United States Patent
Kuttel et al.

(10) Patent No.: US 9,537,315 B2
(45) Date of Patent: Jan. 3, 2017

(54) GENERATOR LOAD CONTROL

(71) Applicant: CANRIG DRILLING TECHNOLOGIY LTD., Houston, TX (US)

(72) Inventors: Beat Kuttel, Spring, TX (US); Tommy Scarborough, Houston, TX (US); Kevin Williams, Cypress, TX (US); Gary Pace, Cypress, TX (US); James Garaghty, Houston, TX (US)

(73) Assignee: CANRIG DRILLING TECHNOLOGY LTD., Houston, TX (US)

( * ) Notice: Subject to any disclaimer, the term of this patent is extended or adjusted under 35 U.S.C. 154(b) by 0 days.

(21) Appl. No.: 14/613,052

(22) Filed: Feb. 3, 2015

(65) Prior Publication Data

US 2015/0222121 A1 Aug. 6, 2015

Related U.S. Application Data

(60) Provisional application No. 61/935,472, filed on Feb. 4, 2014, provisional application No. 62/010,652, filed on Jun. 11, 2014.

(51) Int. Cl.
*H02P 9/00* (2006.01)
*H02P 11/00* (2006.01)
*H02J 3/00* (2006.01)
*H02J 1/00* (2006.01)
*H02J 3/38* (2006.01)
*H02J 3/40* (2006.01)

(52) U.S. Cl.
CPC .. *H02J 3/00* (2013.01); *H02J 1/00* (2013.01); *H02J 3/38* (2013.01); *H02J 3/40* (2013.01); *H02J 2003/003* (2013.01); *H02P 9/00* (2013.01)

(58) Field of Classification Search
USPC ...... 322/7, 17, 44, 59; 290/40 C; 307/25, 23
See application file for complete search history.

(56) References Cited

U.S. PATENT DOCUMENTS 4,590,416 A * 5/1986 Porche .................. H02J 3/1885
174/DIG. 17
5,949,247 A 9/1999 Lima et al.
(Continued)

FOREIGN PATENT DOCUMENTS

WO 2013066486 A1 5/2013

OTHER PUBLICATIONS

International Search Report and Written Opinion issued in PCT/US2015/014286, dated May 7, 2015, 13 pages.

*Primary Examiner* — Julio Gonzalez Ramirez
(74) *Attorney, Agent, or Firm* — Adolph Locklar

(57) ABSTRACT

A power system for an electrical system with highly fluctuating loads is powered by one or more power sources that are slow to react to load changes. The power sources are connected to electrical equipment used on the drill rig which provide active load to the generators. One or more load banks may be positioned to provide passive load to the generators to maintain generally constant generator load, while allowing for instant access to power as active load increases. Generators may be run at 100% capacity, a maximum efficient capacity, or at a high enough level to allow for a sufficiently rapid increase in power output. At least one parameter of a drilling operation may be utilized to anticipate load demand changes.

10 Claims, 4 Drawing Sheets

(56) References Cited

U.S. PATENT DOCUMENTS

| | | | |
|---|---|---|---|
| 6,538,345 B1 | 3/2003 | Maller | |
| 7,633,248 B1 * | 12/2009 | Williams | B66B 1/302 318/150 |
| 7,748,450 B2 * | 7/2010 | Mundell | E21B 43/12 166/250.15 |
| 7,781,904 B2 * | 8/2010 | Stahlhut | H02P 9/00 290/40 C |
| 2005/0134248 A1 | 6/2005 | Locker et al. | |
| 2006/0046107 A1 | 3/2006 | Lindsey | |
| 2006/0060396 A1 | 3/2006 | Rozman | |
| 2008/0203734 A1 * | 8/2008 | Grimes | E21B 3/02 290/40 R |
| 2009/0195074 A1 * | 8/2009 | Buiel | H02J 3/28 307/48 |
| 2011/0148209 A1 * | 6/2011 | Williams | H02J 3/32 307/75 |
| 2012/0223524 A1 * | 9/2012 | Williams | H02J 3/005 290/50 |
| 2012/0292992 A1 * | 11/2012 | Williams | F02D 19/10 307/23 |
| 2013/0271083 A1 | 10/2013 | Williams | |
| 2014/0312711 A1 * | 10/2014 | Warlick | H02J 4/00 307/115 |
| 2015/0035366 A1 * | 2/2015 | Benesch | H02J 4/00 307/52 |
| 2015/0372492 A1 * | 12/2015 | Kuttel | H02J 3/38 175/203 |

\* cited by examiner

GENERATOR LOAD CONTROL

CROSS REFERENCE TO RELATED APPLICATIONS

This application is a non-provisional application which claims priority from U.S. provisional application No. 61/935,472 filed Feb. 4, 2014 and U.S. provisional application No. 62/010,652 filed Jun. 11, 2014.

TECHNICAL FIELD/FIELD OF THE DISCLOSURE

The present disclosure relates generally to electric power transmission from a power source to a time-variant load, and specifically to powering electrical systems with highly fluctuating loads from one or more power sources that are slow to react to load changes.

BACKGROUND OF THE DISCLOSURE

In a modern drilling rig, much of the associated equipment is driven electrically. For some drilling rigs, generators are used to supply electricity to the drilling rig. In general, generators are most efficient when producing power within a certain range of power output. During drilling operations, electric loads may vary greatly depending on what is happening at the rig at any given time. Electrical equipment, including drawworks, mud pumps, top drives, rotary tables, etc. may consume large amounts of power when in use. Because each piece of equipment is used intermittently, the power drawn by the drilling rig may vary greatly at different times, at times going from very high to very low in short intervals. At other times, very little power is consumed by the drilling rig equipment. Additionally, a rapid decrease in electric load may cause a power spike which may cause the rig and generator to automatically shut down.

SUMMARY

The present disclosure provides for a power system for running an electrically driven device using a power load defining an active load when in operation. The power system may include a generator having a minimum efficient load rating. The power system may also include a load bank electrically coupled to the generator and positioned to provide a power load defining a passive load on the generator when engaged. The power system may also include a controller positioned to engage the load bank and activate the passive load.

The present disclosure also provides for a method for controlling a load bank. The method may include providing a power system for running one or more electrically driven devices using a power load defining an active load when in operation. The power system may include one or more generators. Each generator may have a minimum efficient load rating. Each generator may be electrically coupled to the electrically driven device. The power system may further include the load bank. The load bank may be electrically coupled to the generator and positioned to provide a power load defining a passive load on the generator when engaged. The power system may also include a controller positioned to engage the load bank and activate the passive load. The method may also include calculating the minimum total load of the one or more generators; calculating a total power demand of the one or more electrically driven devices; calculating, from the minimum total load and the total power demand, a load bank power demand; and engaging the load bank with the controller to provide passive load to the generators generally equal to the load bank power demand.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
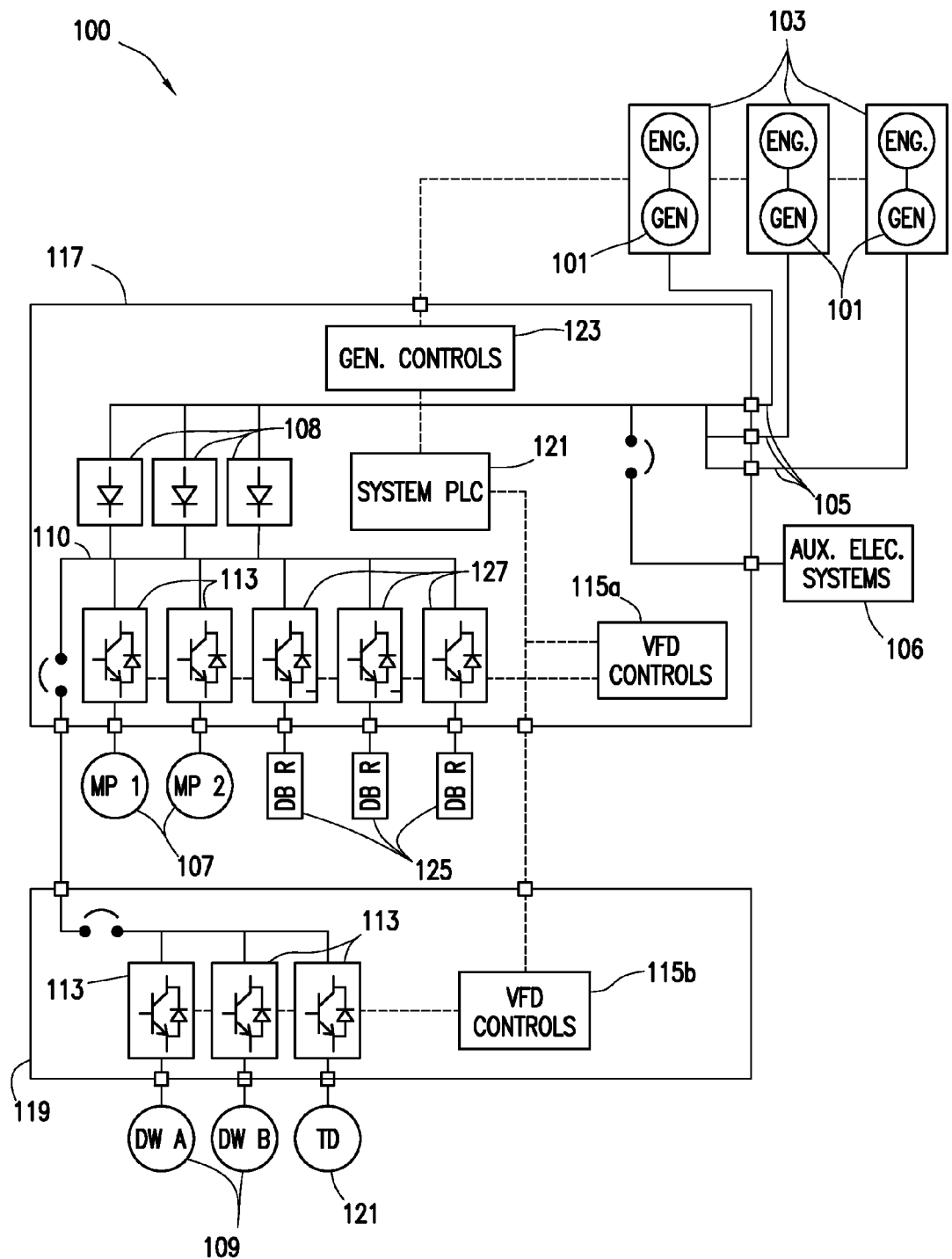
FIG. 1 is a block diagram of a drilling rig electrical system consistent with embodiments of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In some embodiments, a drilling rig power system is powered by one or more electric generators. The electric generators power electrical equipment on the drilling rig, as well as other electrical systems. Electrical equipment may include, for example and without limitation, drawworks, mud pumps, top drives, rotary tables, power tongs, pipe spinners, hydraulic pumps for hydraulic systems, etc. Auxiliary electrical systems may include without limitation, lights, computer systems, control systems, HVAC units, one or more LNG skids, etc. As would be understood by one having ordinary skill in the art with the benefit of this disclosure, these auxiliary electrical systems, unlike the electrical equipment, may generally draw a relatively constant and time-invariant amount of electric power.

FIG. 1 depicts drilling rig electrical system 100 consistent with embodiments of the present disclosure. Generators 101 may be driven by engines 103. In some embodiments, engines 103 may be driven by liquefied natural gas. Generators 101 may supply power through supply lines 105 to supply electrical power to drilling rig electrical system 100. In some embodiments, auxiliary electrical systems 106 may be coupled directly to supply lines 105 as their power demand may remain relatively constant. In some embodiments, the power supplied by generators 101 is rectified by one or more rectifiers 108. In FIG. 1, rectifiers 108 are depicted as single diodes, but one having ordinary skill in the art with the benefit of this disclosure will understand that any suitable rectifier arrangement may be used, including without limitation, half bridge, full bridge, single or multiphase, etc. The output electricity, coupled to DC power bus 110, may then be used to power the electrical equipment. The electrical equipment electrically loads generators 101. The load on the generators caused by the electrical equipment is referred to herein as "active load".

Figure 2:
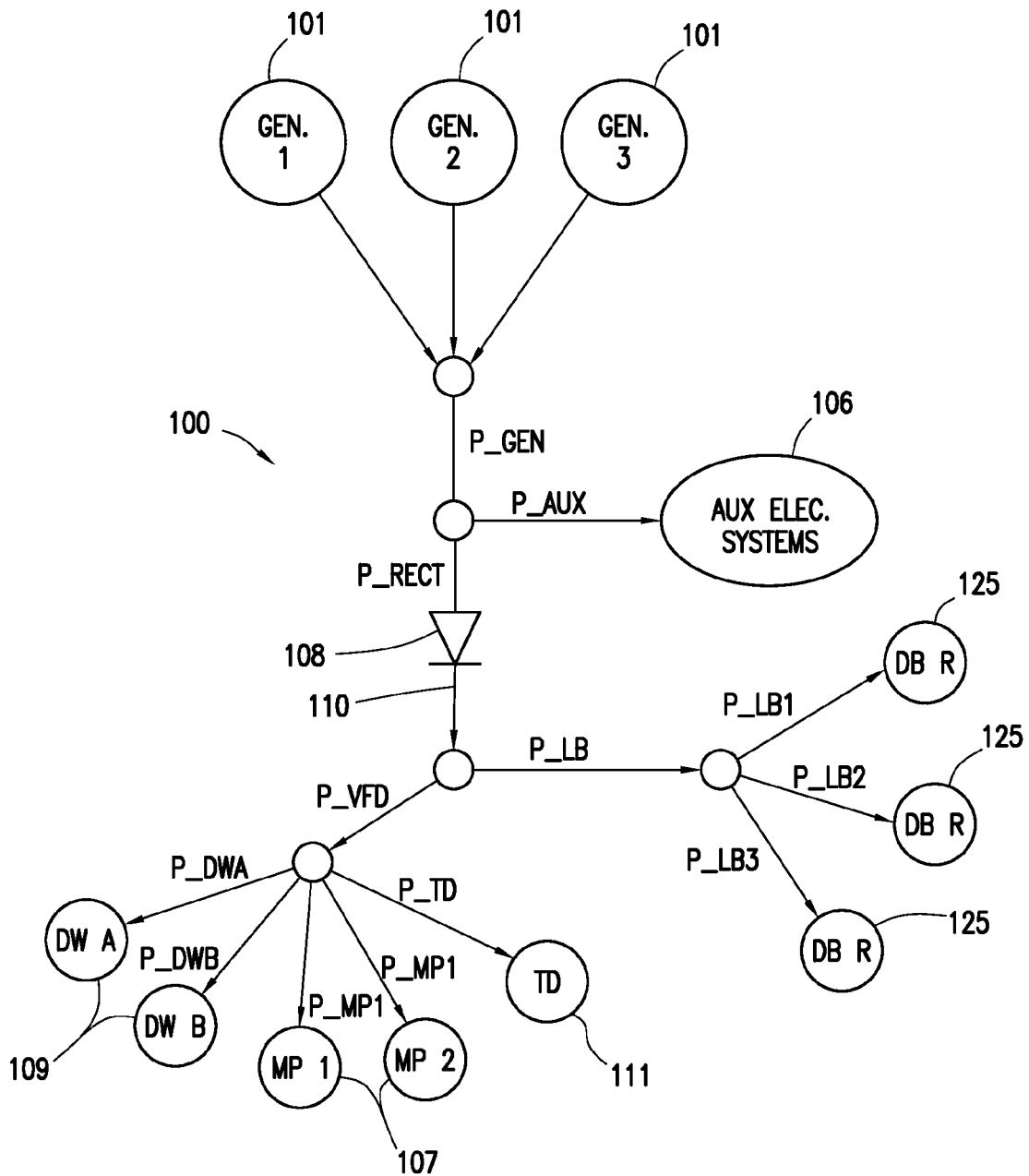
FIG. 2 is a power flow diagram of the drilling rig electrical system of FIG. 1.

In some embodiments, as depicted in FIGS. 1, 2, the electrical equipment may include mud pumps 107, drawworks 109, and top drive 111. In some embodiments, each piece of electrical equipment may be powered by a corresponding inverter 113 capable of being controlled by one or more variable frequency drive (VFD) controllers 115a, 115b. In FIG. 1, two VFD controllers 115a, 115b are depicted, separated between power house 117 and driller's cabin 119. One having ordinary skill in the art with the benefit of this disclosure will understand that a drilling rig need not include power house 117 or driller's cabin 119. Furthermore, although two VFD controllers 115a, 115b are depicted, one having ordinary skill in the art with the benefit of this disclosure will understand that one or more VFD controllers 115 may be used to control the plurality of inverters 113. Inverters 113 are depicted as choppers, but one having ordinary skill in the art with the benefit of this disclosure will understand that any other suitable electronic component or circuit may be substituted within the scope of this disclosure. For example, for a three-phase AC motor, the corresponding inverter 113 would be a three phase inverter and may be controlled by a pulse width modulated (PWM) signal supplied by a corresponding VFD controller 115 as understood in the art. Alternatively, for a DC motor, inverter 113 may be driven by a silicon controlled rectifier (SCR) drive to supply variable voltage controlled by the SCR to provide DC power to the motor.

In some embodiments system programmable logic controller (PLC) 121 may be utilized to control one or more elements of drilling rig electrical system 100. As depicted in FIG. 1, PLC 121 is positioned to control VFD controller 115a and generator controller 123. Generator controller 123 may control the power output of generators 101 by, for example, varying the power output of engines 103 to maintain the proper speed.

As understood in the art, electrical equipment such as mud pumps 107, drawworks 109, and top drive 111 may use large amounts of power when in operation. During a drilling operation, however, each piece of electrical equipment is used in a discontinuous manner causing the active load on generators 101 to vary in time. For example, during a normal (simplified) tripping-out operation, drawworks 109 may be used to lift a pipe string using a pipe elevator, thus consuming a large amount of power supplied through its corresponding inverter 113 as controlled by VFD controller 115b. Drawworks 109 then stops, consuming little or no power, as the upper pipe stand is removed from the pipe string. Drawworks 109 then lowers the elevator to engage the top of the pipe string and repeat the process. While lowering, if regenerative or dynamic braking is used, drawworks 109 may return power to drilling rig electrical system 100. Thus, the active load on generators 101 may vary greatly during the course of drilling operations. Additionally, when the active load is varied rapidly, generators 101 may not be able to supply enough power, causing a potential blackout as electrical equipment may shut off when insufficient power is available. Likewise, voltage spikes may be damaging for electrical equipment or generators 101 themselves.

To regulate the power level of drilling rig electrical system 100, in some embodiments, generator controller 123 may lower the output power of generators 101 by reducing the fuel supplied to engines 103 or reducing excitation to generator 101. In some embodiments, generator controller 123 may shut down one or more of generators 101 depending on current rig conditions.

Generators 101 may operate most efficiently when producing a certain range of electrical power. Likewise, generators 101 may operate most efficiently when electrically loaded. Thus, there may be a lower limit to the power output capable of being produced efficiently by generators 101 and a lower limit on electrical loading to allow generators 101 to operate efficiently or safely. Additionally, because starting up and shutting down generators 101 may require a large amount of time and/or fuel, it may be inefficient to entirely power down one or more generators 101 during normal drilling operations. Furthermore, because the active load may rapidly increase due to, for example, the use of drawworks 109 in the different steps of the tripping operation described above, the time required to change the power output of engines 103 to vary the power output of generators 101 may result in insufficient power availability to drawworks 109.

The power output of engines 103 may be controlled by varying the amount of fuel supplied to the engine to maintain the speed of generators 101. However, engines 103, including engines 103 powered by LNG or pipeline gas, may not be able to respond quickly enough to maintain generator speed with rapid changes in active load. Changes in the amount of fuel provided to the engine may be slowed by, for example, fuel travelling through fuel lines, compressing larger amounts of fuel, and revaporization of the fuel for the engine. Engines 103 may, as understood in the art, be able to more rapidly change in power output if already running over a certain load level. In some embodiments of the present disclosure, generators 101 may be operated at a relatively constant power output, at or near the minimal efficient power output level. In such embodiments, the engine may thus be more able to cope with rapid increases in active.

In some embodiments, the generators may be operated at a power output level corresponding with maximum power output efficiency as dictated by the design and specifications of the generators. In some embodiments, the generators may be operated at maximum power output to, for example, maximize the instantaneous power available to the drilling rig.

In some embodiments, to maintain generally even power load to generators 101 or to reduce load fluctuations, one or more load banks 125 may be connected to generators 101. In some embodiments, load banks 125 may be electrically coupled to generators 101 through load bank inverters 127. In some embodiments, inverters 127 may be choppers as understood in the art and may be connected to DC power bus 110. In some embodiments, inverters 127 may be AC converters coupled to an AC power bus. Load banks 125 may, as understood in the art, be positioned to dissipate electric power produced by generators 101, by adding so called "passive load" to the generator power supply. Although not directly used by drilling rig electrical system 100 during a drilling operation as is the other electrical equipment, the passive load may be utilized to balance changes in active load. Thus, generators 101 may operate under generally constant loading and load fluctuations may be minimized. In some embodiments, load banks 125 may include resistive elements as shown in FIG. 1, positioned to provide passive load by converting electric power to heat. In other embodiments, load banks 125 may be any other load bank, including, for example and without limitation, load banks 125 adapted to apply one or more of resistive load, inductive load, liquid load (provided by, for example, a pump and a choke), wind resistance load, regenerative load (which may supply power to a separate grid such as the utility grid), capacitive load, or inertial load (such as a flywheel), used to power a motor/generator set, or used to charge a battery. VFD controller 115a, controlled by PLC 121, controls load bank inverters 127 to provide passive load to generators 101 by supplying electrical power to load banks 125, thus allowing generators 101 to operate at an efficient power output regardless of active load from other electrical equipment on the drilling rig by adding passive load. Additionally, any negative active load, such as power generated by dynamic braking of drawworks 109, may likewise be dissipated by load banks 125.

In some embodiments which utilize a resistive element in load banks 125, total power dissipated by load banks 125 may be given by the following equation:

$$P_d = 3 \cdot N_B \cdot M \cdot \frac{V_{dc}^2}{R}, \quad (1)$$

where $P_d$ is the power dissipated as passive load, $N_B$ is the number of three phase load banks, R is the per-phase resistance, and M is the duty cycle which varies between 0 and 1. As understood in the art, duty cycle refers to the fraction of time the load banks are on in a PWM control system. The PWM control system thus allows load banks 125 to proportionately dissipate any power level between 0-100% of their full power dissipation capability. In an exemplary drilling rig electrical system 100, each load bank 125 may include three 2Ω resistors each with a power rating of 300 kW and 400 kW peak. The continuous rating for each load bank 125 is thus 900 kW, and peak of 1200 kW. If three load banks 125 are included in drilling rig electrical system 100, the total continuous and peak dissipation ratings are thus 2.7 MW and 3.6 MW respectively. One having ordinary skill in the art with the benefit of this disclosure will understand that a similar equation may be formulated for any other type of load bank, and the power dissipated as passive load will likewise depend on the duty cycle.

As an example, during operation, the voltage on DC bus 110 may be, for example, 780V. According to equation (1), load banks 125 may thus provide between zero and 2737 kW of power dissipation. Thus, for drilling rig electrical system 100 including three generators 101, the minimum efficient load rating for each generator 101 may be up to approximately 900 kW.

The additional power generated by dynamic braking of drawworks 109 as previously described, however, may also be dissipated through load banks 125. The total generator load may thus be calculated by the following equation:

$$L_{G,Total} = P_d + L_{aux} - P_{DW}, \quad (2)$$

where $L_{G,Total}$ is the total generator load, $L_{aux}$ is the load of auxiliary electrical systems 106, and $P_{DW}$ is the power generated by drawworks 109 during dynamic braking Equation (2) may be used to determine the maximum power that may be regenerated by drawworks 109 while maintaining the minimum efficient load rating for generators 101, maintaining a generally constant load on generators 101. Depending on the number of active generators 101, it may be necessary to operate drawworks 109 at a lower ramp rate on deceleration to ensure the maximum regenerated power is not exceeded.

Figure 3:
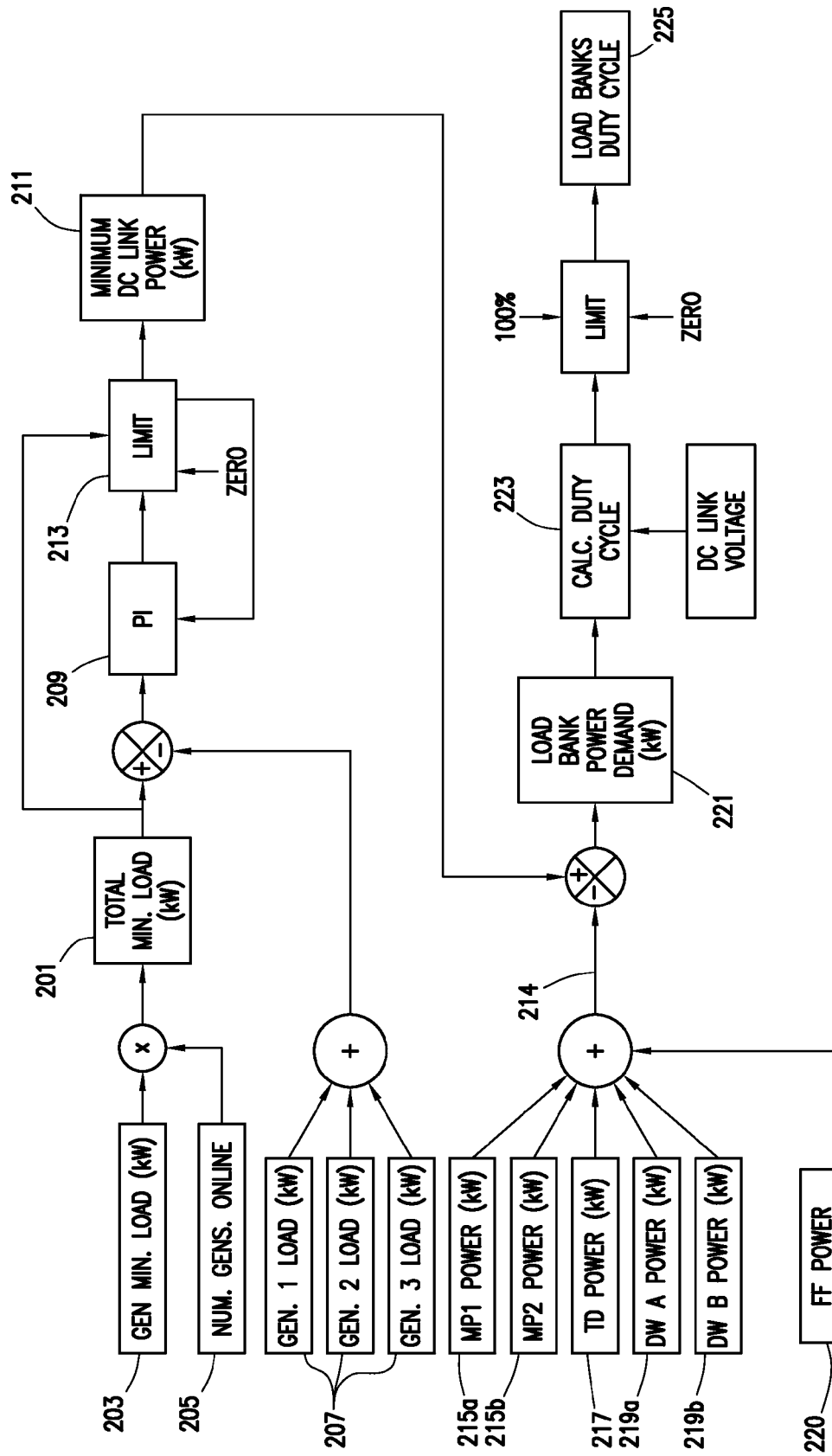
FIG. 3 is a block diagram for a control system for a resistor bank consistent with embodiments of the present disclosure.

In some embodiments, PLC 121 or a separate controller may determine the amount of passive load to apply with load banks 125. As depicted in FIG. 3, total minimum generator load 201 may be calculated by multiplying the minimum generator load 203 by the number of generators online 205. Actual generator loads 207, as supplied by the generator controller, are subtracted from total minimum generator load 201 to create a differential power error signal to be used by controller 209 to calculate minimum DC link power 211. Controller 209 may be part of PLC 121 or a separate controller. Minimum DC link power 211 may be limited by limiter 213 between a value of zero and total minimum generator load 201. Additionally, minimum DC link power 211 may be fed into controller 209 to, for example, prevent windup as understood in the art. In some embodiments, the maximum load change able to be handled by drilling rig electrical signal 100 may be fed into controller 209 as well.

Total power demand 214 which corresponds to the active load may be calculated as the sum of the power demands for each piece of electrical equipment. The power demands include mud pump power demand 215a-b, top drive power demand 217, and drawworks power demand 219a-b. As previously discussed, drawworks power demand 219a-b may be negative during dynamic braking.

In some embodiments, controller 209 may be a proportional integral derivative (PID) controller. One having ordinary skill in the art with the benefit of this disclosure will understand that controller 209 may be any controller capable of operating as described including, without limitation, a step change controller, a state controller, a proportional controller (P), a proportional integral controller (PI), a PID controller, a proportional derivative controller (PD), an adaptive controller, or a predictive controller. In certain embodiments, anticipated load change may be based on process variables in addition to actual generator load to form a multi-variable control system. In some embodiments, additional process variables may include operational parameters, including, for example and without limitation, depth of wellbore, hook load, pump pressure, pump rate, length of drill string, and weight on bit, as well as any changes or requested changes thereto. In some embodiments, additional process variables may include power generation and distribution parameters, including, for example and without limitation, increase or change in current, increase or change in power, and number of engines online, as well as any requested changes thereto. As a non-limiting example, it may be anticipatable that a drilling bit at a greater depth may result in a larger top drive power demand 217. As another example, a longer drill string may result in a larger drawworks power demand 219a-b during, for example, a tripping operation. By incorporating an anticipated load into total power demand 214, the response time for controller 209 may, for example, be improved.

Total power demand 214 may be subtracted from minimum DC link power 211 to determine load bank power demand 221 or the amount of passive load to add to the system. Additionally, any auxiliary load may also be subtracted as well. Load bank power demand 221 may then be used to calculate (at 223) load bank duty cycle 225 according to the following equation, derived from Equation 1 above:

$$M = \frac{P_d \cdot R}{3 \cdot N_B \cdot V_{dc}^2}. \quad (3)$$

Figure 4:
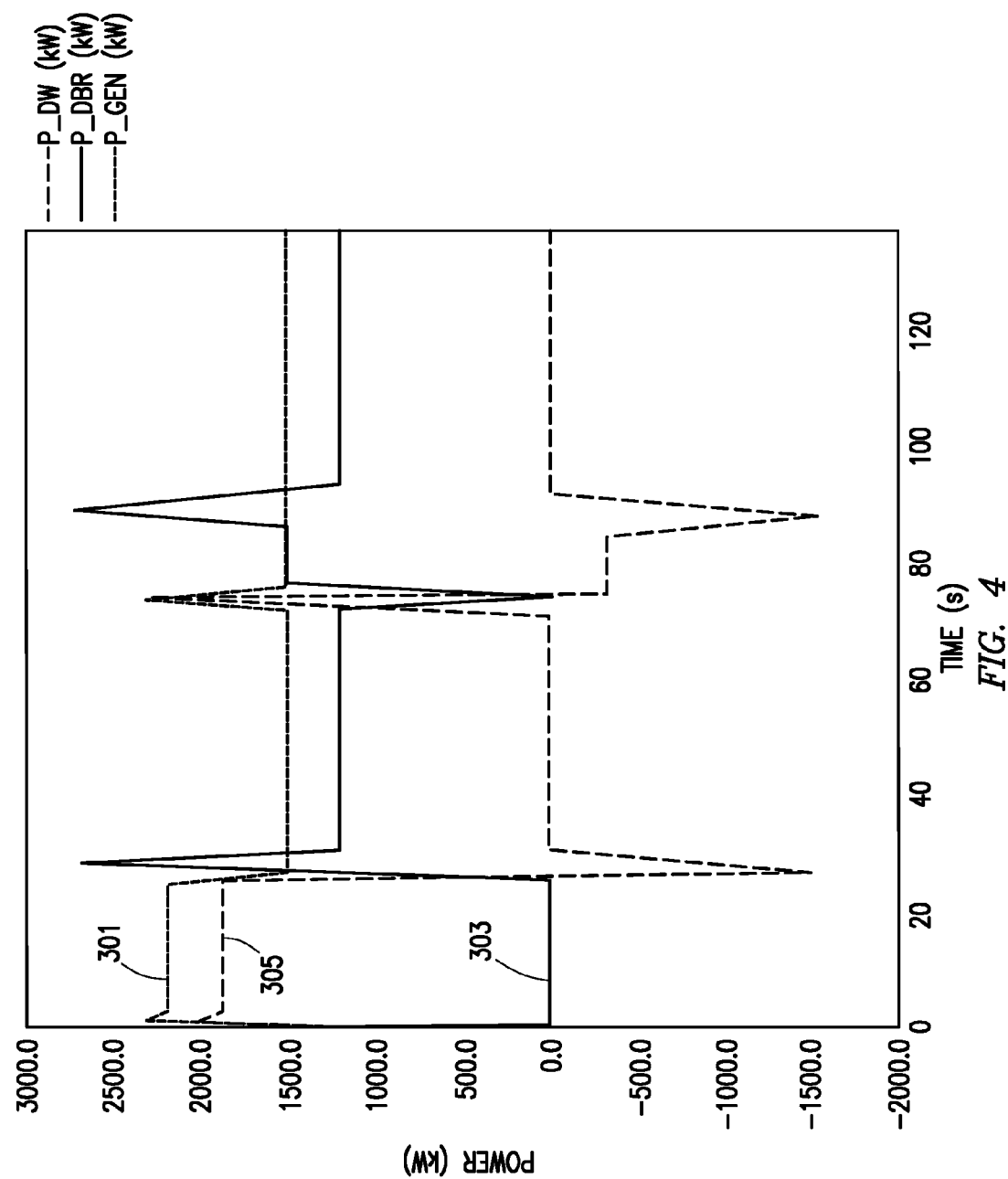
FIG. 4 is a graph of power consumption in a typical tripping operation for a drilling rig electrical system consistent with embodiments of the present disclosure.

FIG. 4 depicts power flow during an exemplary tripping cycle as previously discussed. Any values depicted are shown for exemplary purposes only and are not intended to be limiting in any way. Depicted is generator power 301 (dotted line), load bank power 303 (solid line), and drawworks power 305 (dashed line) over time. Auxiliary load is assumed to be a constant 300 kW, and no power is going to any other electrical equipment. Additionally, drawworks dynamic braking power is limited to 1.5 MW.

From time 0 to time 22, the drawworks is lifting the drill string. The drawworks is utilizing 1900 kW, while the generators provide 2200 kW. The 300 kW difference is consumed by the auxiliary load, and thus the load banks are dissipating no power. At time 22, the drawworks are stopped, causing a large negative inductive power spike and a negative (regenerative) load during the slow-down of the drawworks. The load banks are activated, in some embodiments at a 100% duty cycle, to dissipate the power spike. In some embodiments, generator power output may be reduced to the minimum efficient power output, here 1500 kW. If the load banks were not activated, negative power from the drawworks may over speed the generators. Such an event may trigger a generator safety circuit which would shut the generators off, thus causing a "black-out".

Once the inductive spike is dissipated and the drawworks has stopped, the load banks are used to dissipate excess power from the generators. The load bank duty cycle is calculated such that the load banks dissipate 1200 kW.

At time 70, the drawworks are beginning to lower the elevator, causing a positive inductive power spike followed by a period of negative power lasting until the drawworks is stopped. The load banks are deactivated, and the output of generators is increased to supply sufficient power to absorb the inductive spike. After the spike, as the drawworks lower, dynamic braking thereof generates 300 kW of power. The load bank duty cycle is modified so that the load banks dissipate 1500 kW of power. The drawworks are then stopped, again causing a large negative inductive spike, again dissipated by the load banks. Thus after time 90, the drawworks are drawing no power, the generators generating 1500 kW, and the load banks dissipating 1200 kW, again the difference between the generator output and the auxiliary load.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A method for controlling a load bank comprising:
providing a power system for running one or more electrically driven devices using a power load defining an active load when in operation, the power system including:
one or more generators, each generator having a minimum efficient load rating, each generator electrically coupled to the electrically driven device;
the load bank, the load bank electrically coupled to the generator and positioned to provide a power load defining a passive load on the generator when engaged; and
a controller positioned to engage the load bank and activate the passive load;
calculating a total minimum generator load of the one or more generators by multiplying the minimum efficient load rating by the number of generators;
calculating a total power demand of the one or more electrically driven devices;
calculating, from the total minimum generator load and the total power demand, a load bank power demand; and
engaging the load bank with the controller to provide passive load to the generators generally equal to the load bank power demand.

2. The power system of claim 1, wherein the load bank is adapted to provide one or more of a resistive, inductive, liquid, wind resistance, regenerative, inertial, or capacitive load or to provide load to charge a battery or to run a motor/generator set.

3. The method of claim 1, wherein the load bank is electrically coupled to the generator via an inverter, the inverter being controlled by the controller to selectively connect and disconnect the load bank from the generator.

4. The method of claim 3, wherein the inverter is coupled to a variable frequency drive, the variable frequency drive having a DC link, so that the load bank draws power from the DC link.

5. The method of claim 3, wherein the inverter is driven by a PWM signal sent by the controller, and the passive load is determined by the duty cycle of the inverter.

6. The method of claim 5, wherein the duty cycle of the PWM signal proportionally controls the passive load of the load bank from 0-100% of the load capability of the load bank.

7. The method of claim 5, wherein the load bank further comprises one or more three phase resistive load banks, and the duty cycle is calculated according to:

$$M = \frac{P_d \cdot R}{3 \cdot N_B \cdot V_{dc}^2},$$

where $P_d$ is the power dissipated as passive load, $N_B$ is the number of load banks, R is the per-phase resistance of the three phase load banks, and M is the duty cycle of the inverter.

8. The method of claim 1, wherein the output power of the one or more generators is controllable by the controller, and the method further comprises:
controlling the power output of the one or more generators based on the total power demand.

9. The method of claim 1, wherein a process variable for the controller is actual generator load.

10. The method of claim 9, comprising an additional variable for the controller selected from the group consisting of depth of wellbore, hook load, pump pressure, pump rate, length of drill string, weight on bit, increase or change in current, increase or change in power, and number of engines online, or any changes or requested changes thereto.

* * * * *